United States Patent
Tateishi et al.

(10) Patent No.: US 11,868,078 B2
(45) Date of Patent: Jan. 9, 2024

(54) IMAGE FORMING APPARATUS INCLUDING EXTERNAL SHEET FEED TRAY WITH SHEET FEEDER

(71) Applicant: CANON KABUSHIKI KAISHA, Tokyo (JP)

(72) Inventors: Tomoya Tateishi, Kanagawa (JP); Kazuhiro Hosohara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/749,516

(22) Filed: May 20, 2022

(65) Prior Publication Data
US 2022/0382208 A1  Dec. 1, 2022

(30) Foreign Application Priority Data

May 31, 2021 (JP) ................. 2021-090834

(51) Int. Cl.
| | |
|---|---|
| G03G 21/00 | (2006.01) |
| H04N 1/00 | (2006.01) |
| G03G 15/00 | (2006.01) |
| G03G 21/16 | (2006.01) |

(52) U.S. Cl.
CPC ..... *G03G 21/1633* (2013.01); *G03G 15/6514* (2013.01); *H04N 1/00546* (2013.01); *H04N 1/00551* (2013.01); *H04N 1/00559* (2013.01); *B65H 2402/45* (2013.01); *B65H 2407/21* (2013.01); *B65H 2801/06* (2013.01);
(Continued)

(58) Field of Classification Search
CPC ........... G03G 15/6514; G03G 21/1633; G03G 2215/00392; G03G 2215/00396; G03G 2221/1687; G03G 2221/169; H04N 1/00546; H04N 1/00559; B65H 2401/31; B65H 2402/45; B65H 2801/03; B65H 2801/06; B65H 2801/15; B65H 2407/21
USPC .......................................... 399/111, 124, 392
See application file for complete search history.

(56) References Cited

U.S. PATENT DOCUMENTS

| | | | |
|---|---|---|---|
| 7,062,216 B2 * | 6/2006 | Nobe ................. | G03G 15/6508 |
| | | | 399/391 |
| 9,487,367 B2 | 11/2016 | Otsuki | |

(Continued)

FOREIGN PATENT DOCUMENTS

JP     2014046996 A     3/2014

*Primary Examiner* — Robert B Beatty
(74) *Attorney, Agent, or Firm* — ROSSI, KIMMS & McDOWELL LLP

(57) ABSTRACT

An image forming apparatus includes an apparatus body including a side surface portion in which an opening is formed, a cartridge, an opening/closing member configured to be moved with respect to the apparatus body between a closed position and an opened position, a sheet stacking portion, a feed roller, and a lifting member configured to lift and lower the feed roller. In the state where the opening/closing member is positioned in the closed position, at least part of the lifting member is positioned an inside of a movement locus through which the cartridge passes in a case where the cartridge is attached to and detached from the apparatus body. In a state where the opening/closing member is positioned in the opened position, a whole of the lifting member is positioned an outside of the movement locus.

20 Claims, 8 Drawing Sheets

(52) U.S. Cl.
CPC ............ *G03G 2215/00392* (2013.01); *G03G 2221/1687* (2013.01)

(56) References Cited

U.S. PATENT DOCUMENTS

| | | | |
|---|---|---|---|
| 2013/0251396 A1* | 9/2013 | Shikata | G03G 21/1633 |
| | | | 312/309 |
| 2014/0137372 A1* | 5/2014 | Yamashita | E05D 3/02 |
| | | | 16/221 |
| 2015/0147087 A1* | 5/2015 | Morita | G03G 21/1619 |
| | | | 399/110 |
| 2016/0327897 A1* | 11/2016 | Kondo | G03G 15/6529 |
| 2017/0371294 A1* | 12/2017 | Ao | B65H 5/062 |
| 2019/0361390 A1* | 11/2019 | Adachi | G03G 21/1853 |
| 2020/0133159 A1* | 4/2020 | Sato | B65H 5/06 |
| 2021/0047139 A1* | 2/2021 | Kannari | B65H 1/04 |
| 2022/0127089 A1* | 4/2022 | Tateishi | G03G 15/6514 |
| 2022/0127090 A1* | 4/2022 | Tateishi | B65H 3/0684 |
| 2022/0185605 A1* | 6/2022 | Nitta | G03G 15/6511 |
| 2022/0332530 A1* | 10/2022 | Nishiyama | G03G 15/6514 |

* cited by examiner

IMAGE FORMING APPARATUS INCLUDING EXTERNAL SHEET FEED TRAY WITH SHEET FEEDER

BACKGROUND OF THE INVENTION

Field of the Invention

This disclosure relates to an image forming apparatus which forms an image on a sheet.

Description of the Related Art

Some of image forming apparatuses such as a printer, a copier, and a multifunction machine include a so-called manual feed type sheet feeding apparatus in which a sheet stacking portion (also called as a manual feed tray) is disposed to an opening/closing member disposed on a side surface of the apparatus body in an openable manner. In this kind of the sheet feeding apparatus, a feed roller (also called as a pickup roller) disposed above the sheet stacking portion is held by a pivotable lifting member such as a lifting arm, so that the feed roller is configured to be liftable with respect to the sheet stacking portion. Then, at the time of feeding the sheet, the feed roller is lowered so as to come into contact with the sheet on the sheet stacking portion, and feeds the sheet by rotating.

Further, an electrophotographic type image forming apparatus includes a process cartridge unitizing a photosensitive drum and members for performing an electrophotographic process as a cartridge detachable from the apparatus body. In a case performing an exchange of the process cartridge, a user is able to attach and detach the process cartridge by opening an opening/closing member disposed in the apparatus body for the attachment and detachment of the cartridge.

In the image forming apparatus including both of the manual feed type sheet feeding apparatus and the process cartridge, in some cases, both of the manual feed type sheet feeding apparatus and the opening/closing member for the attachment and detachment of the process cartridge are disposed on the same side surface of the apparatus body. With this disposition, since the user is able to use the manual feed type sheet feeding apparatus and exchange the process cartridge by accessing from the same direction with respect to the image forming apparatus, usability is improved. A color printer in which the manual feed type sheet feeding apparatus and a front cover, which is opened at the time of exchanging the process cartridge, are disposed on the front surface portion of the apparatus body is described in Japanese Patent Laid-Open No. 2014-46996.

Incidentally, in a case where the manual feed type sheet feeding apparatus and the process cartridge are disposed on the same side surface of the apparatus body, it is necessary to prevent the feed roller or the lifting arm from interfering in the attachment and detachment of the process cartridge. In the color printer described in the above-mentioned literature, the whole of the feed roller and the lifting arm constituting the manual feed type sheet feeding apparatus is disposed below a movement locus of the process cartridge attached to and detached from the apparatus body. However, if the feed roller and the lifting arm are disposed so as to be positioned always below the movement locus of the process cartridge, including a case of not attaching and detaching the process cartridge, sometimes, it is forced to compromise on dispositions or the size of the feed roller and the lifting arm.

SUMMARY OF THE INVENTION

This disclosure provides an image forming apparatus capable of achieving both of the improvement in usability and design flexibility.

According to one aspect of the invention, an image forming apparatus includes an apparatus body including a side surface portion in which an opening is formed, a cartridge detachably attached to the apparatus body, an opening/closing member configured to be moved with respect to the apparatus body between a closed position and an opened position, the closed position being a position in which the opening/closing member covers the opening of the side surface portion, the opened position being a position in which the opening is exposed and the cartridge is allowed to be attached to and detached from the apparatus body through the opening, a sheet stacking portion, a feed roller configured to feed a sheet stacked on the sheet stacking portion toward the apparatus body, and a lifting member configured to lift and lower the feed roller such that the feed roller is brought into contact with and is separated from the sheet on the sheet stacking portion in a state where the opening/closing member is positioned in the closed position, the lifting member being supported by the apparatus body and configured to move with respect to the apparatus body in conjunction with a movement of the opening/closing member from the closed position to the opened position, wherein, in the state where the opening/closing member is positioned in the closed position, at least part of the lifting member is positioned an inside of a movement locus through which the cartridge passes in a case where the cartridge is attached to and detached from the apparatus body, and wherein, in a state where the opening/closing member is positioned in the opened position, a whole of the lifting member is positioned an outside of the movement locus.

According to another aspect of the invention, an image forming apparatus includes an apparatus body including a side surface portion in which an opening is formed, a cartridge detachably attached to the apparatus body, an opening/closing member configured to be moved with respect to the apparatus body between a closed position and an opened position, the closed position being a position in which the opening/closing member covers the opening of the side surface portion, the opened position being a position in which the opening is exposed and the cartridge is allowed to be attached to and detached from the apparatus body through the opening, a sheet stacking portion, a feed roller configured to feed a sheet stacked on the sheet stacking portion toward the apparatus body, and a lifting member configured to lift and lower the feed roller such that the feed roller is brought into contact with and is separated from the sheet on the sheet stacking portion in a state where the opening/closing member is positioned in the closed position, wherein the lifting member is configured to move downward in conjunction with a movement of the opening/closing member from the closed position to the opened position so that the cartridge is attached to and detached from the apparatus body through a space above the lifting member in a state where the opening/closing member is positioned in the opened position.

Further features of the present invention will become apparent from the following description of exemplary embodiments with reference to the attached drawings.

DESCRIPTION OF THE EMBODIMENTS

Figure 1:
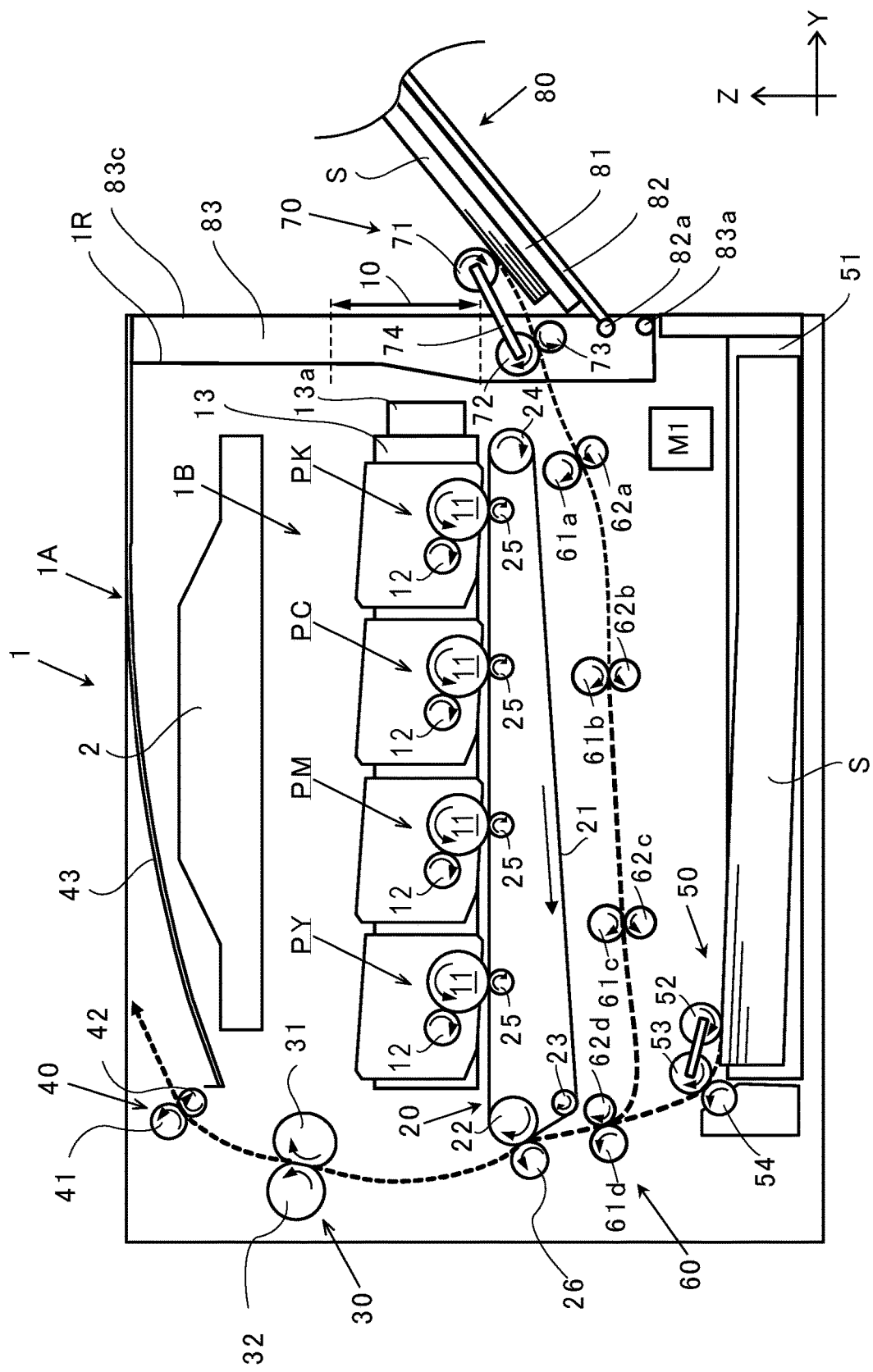
FIG. 1 is a schematic diagram showing an image forming apparatus relating to embodiments.

Hereinafter, referring to the drawings, embodiments relating to this disclosure will be described.

Using FIGS. 1 to 8, an image forming apparatus 1 relating to this embodiment will be described. The image forming apparatus 1 illustrated in this embodiment is a color laser beam printer forming a color image on a sheet S by an electrophotographic process using four colors of toners. To be noted, as the sheet S, serving as a recording material, it is possible to use various kinds of sheet materials different in size and materials, including paper such as standard paper and cardboard, a plastic film, cloth, a surface treated sheet material such as coated paper, and a specially shaped sheet such as an envelope and an index sheet.

In the embodiment and the drawings below, an upward direction in the vertical direction for a case where the image forming apparatus 1 is installed on the horizontal plane is referred to as a Z direction. A rotational axis direction of a photosensitive drum 11 included in the image forming apparatus 1 is referred to as an X direction.

The horizontal direction when viewed in the X direction (direction orthogonally intersecting with the Z direction) is referred to as a Y direction. The X direction is a main scanning direction at an image formation, and also a sheet width direction orthogonally intersecting with a sheet conveyance direction inside of the image forming apparatus. The sheet width direction orthogonally intersects with a thickness direction of the sheet.

A side surface of the image forming apparatus 1, which is approximately in a cuboid shape, in the Y direction is a side surface on which a manual feed tray type sheet feeding apparatus 70 and a cartridge door 83, described below, are disposed. The X, Y, and Z directions are directions intersecting with each other, preferably, orthogonally intersecting with each other. Further, shapes and dispositions of members detachable from the image forming apparatus will be described using the X, Y, and Z directions based on positions and postures of the members in a state attached to the image forming apparatus.

FIG. 1 is a schematic diagram showing the image forming apparatus 1 relating to this embodiment. Hereinafter, an overall configuration and a function of this image forming apparatus 1 will be described. An image forming unit 1B, serving as an image forming unit, in which four process cartridges PY, PM, PC, and PK of the first to the fourth are disposed approximately along the horizontal direction (in-line configuration, tandem type) is mounted in the inside of an apparatus body 1A (inside of an apparatus body) of the image forming apparatus 1. While the respective process cartridges PY to PK are different in the colors of the toners stored as developer, configurations are similar to each other. In each of the respective process cartridges PY to PK of this embodiment, a photosensitive drum 11, serving as an image bearing member (electrophotographic photosensitive member), a developing roller 12, serving as a process portion acting on this photosensitive drum 11, and the like are integrally assembled inside of the cartridge.

The respective process cartridges PY to PK are stored in mounting portions (mounting space) disposed in a cartridge tray 13, serving as a cartridge support member, and attached to the apparatus body 1A excluding in a state supported by the cartridge tray 13. As described later, a user is able to attach and detach the process cartridges PY to PK to and from the apparatus body 1A by opening the cartridge door 83 of a door unit 80 and drawing the cartridge tray 13 from the apparatus body 1A. To be noted, the apparatus body 1A of the image forming apparatus 1 in this embodiment indicates a part of the image forming apparatus 1, excluding the door unit 80, the cartridge tray 13, the process cartridges PY to PK, and a storage tray 51, described later.

A laser scanner 2 is disposed above the process cartridges PY to PK. An intermediate transfer belt unit 20 is disposed below the process cartridges PY, PM, PC, and PK. In the intermediate transfer belt unit 20, an intermediate transfer belt 21, serving as an intermediate transfer member, is stretched over a drive roller 22, a driven roller 23, and a tension roller 24, and rotatably driven in a clockwise direction in FIG. 1. Lower surfaces of the photosensitive drums 11 of the respective process cartridges PY to PK come into contact with an upper surface of the intermediate transfer belt 21. Four primary transfer rollers 25 are disposed inside of the intermediate transfer belt 21 so as to face the photosensitive drums 11 of the respective process cartridges PY to PK. A secondary transfer roller 26 comes into contact with the drive roller 22 via the intermediate transfer belt 21. A fixing unit 30 and a sheet discharge unit 40 are disposed in an upper part of the apparatus body 1A. A sheet discharge tray 43 is disposed on an upper surface of the apparatus body 1A. The fixing unit 30 includes a fixing film 31 incorporating a heater substrate inside and a press roller 32 coming into press contact with the heater substrate via the fixing film 31. The sheet discharge unit 40 includes a sheet discharge roller 41 and a sheet discharge driven roller 42.

In a case where the image forming apparatus 1 performs an image forming operation, the photosensitive drum 11 is rotatably driven, and a surface of the photosensitive drum 11 is uniformly charged. The laser scanner 2 scans and exposes the surface of the photosensitive drum 11 by irradiating a laser beam based on image information (printing data) received from the outside, and forms an electrostatic latent image on the photosensitive drum 11. This electrostatic latent image is visualized (developed) as a toner image by the developing roller 12.

The toner image formed on the photosensitive drum 11 is primarily transferred onto the intermediate transfer belt 21 by the primary transfer roller 25. Since, at this time, the toner images formed in the process cartridges PY to PK are multiply transferred onto the intermediate transfer belt 21 so as to be superimposed on each other, and the toner image of a full color is formed on the intermediate transfer belt 21. This toner image is borne by the intermediate transfer belt 21, and conveyed to a secondary transfer portion which is a nip portion between the intermediate transfer belt 21 and a secondary transfer roller 26.

In parallel with the operation of the image forming unit 1B described above, the sheet S, serving as the recording material, is fed from the sheet feeding apparatuses 50 and 70 to the image forming unit 1B. The image forming apparatus 1 includes the storage tray type sheet feeding apparatus 50 and the manual feed tray type (manual feed type) sheet feeding apparatus 70.

The storage tray type sheet feeding apparatus 50 includes the sheet S stacked inside of a storage tray 51 inserted into the apparatus body 1A in a drawable manner, and a sheet feed unit including a pickup roller 52, a feed roller 53, and a separation roller 54. The pickup roller 52 comes into contact with an uppermost sheet of the sheet S stacked on the storage tray 51, and is rotatably driven so as to send out the sheet S in a left direction in the FIG. 1. The feed roller 53 further conveys the sheet S received from the pickup roller 52. The separation roller 54 forms a separation nip by coming into contact with the feed roller 53, and separates the sheet S conveyed by the feed roller 53 from the other sheet S by applying friction force to the sheet passing through the separation nip. Next, a leading edge of the sheet S sent out by the feed roller 53 abuts onto a nip portion of a conveyance roller 61*d* and a conveyance driven roller 62*d* of a conveyance roller pair 60 (registration roller pair), so that the skew of the sheet is corrected.

The manual feed type sheet feeding apparatus 70 is disposed on a side surface portion 1R (side surface portion on a right side in FIG. 1) of the apparatus body 1A in the Y direction. The sheet S stacked (supported) on a sheet stacking tray 81 (sheet stacking portion, sheet supporting portion) of the door unit 80 is fed one sheet at a time. A detailed configuration of the sheet feeding apparatus 70 will be described later. The sheet S fed from the sheet feeding apparatus 70 is conveyed toward the conveyance roller pair 60 by conveyance rollers 61*a*, 61*b*, 61*c*, and 61*d* and conveyance driven rollers 62*a*, 62*b*, 62*c*, and 62*d*. Then, the skew of the sheet S is corrected by abutting onto the nip portion of the conveyance roller pair 60 which is in a stop state. The operation which the image forming apparatus 1 performs on the sheet S after the sheet S has reached the nip portion of the conveyance roller pair 60 is similar to a case where the sheet S is fed from the storage tray type sheet feeding apparatus 50.

After the skew of the sheet S has been corrected, the conveyance roller pair 60 starts the conveyance of the sheet S in the timing synchronizing with the operation of the image forming unit 1B, and conveys the sheet S to the secondary transfer portion. The toner image borne on the intermediate transfer belt 21 is secondarily transferred onto the sheet S at the secondary transfer portion. The sheet S onto which the toner image has been transferred is sent to the fixing unit 30, and the toner image is fixed on the sheet S by heated and pressed at a nip portion of the fixing film 31 and the press roller 32. Thereafter, the sheet S is discharged outside of the apparatus body 1A by the sheet discharge roller 41 and the sheet discharge driven roller 42, and stacked on the sheet discharge tray 43.

The image forming unit 1B described above is an example of the image forming unit, and it is acceptable to use an electrophotographic mechanism of a direct transfer system directly transferring the toner image formed on the image bearing member onto the sheet. Further, it is not limited to the electrophotographic system, and it is acceptable to use a printing unit of an ink jet system and an offset printing mechanism for the image forming unit.

Configuration and Operation of Manual Feed Tray Type Sheet Feeding Apparatus

Figure 2:
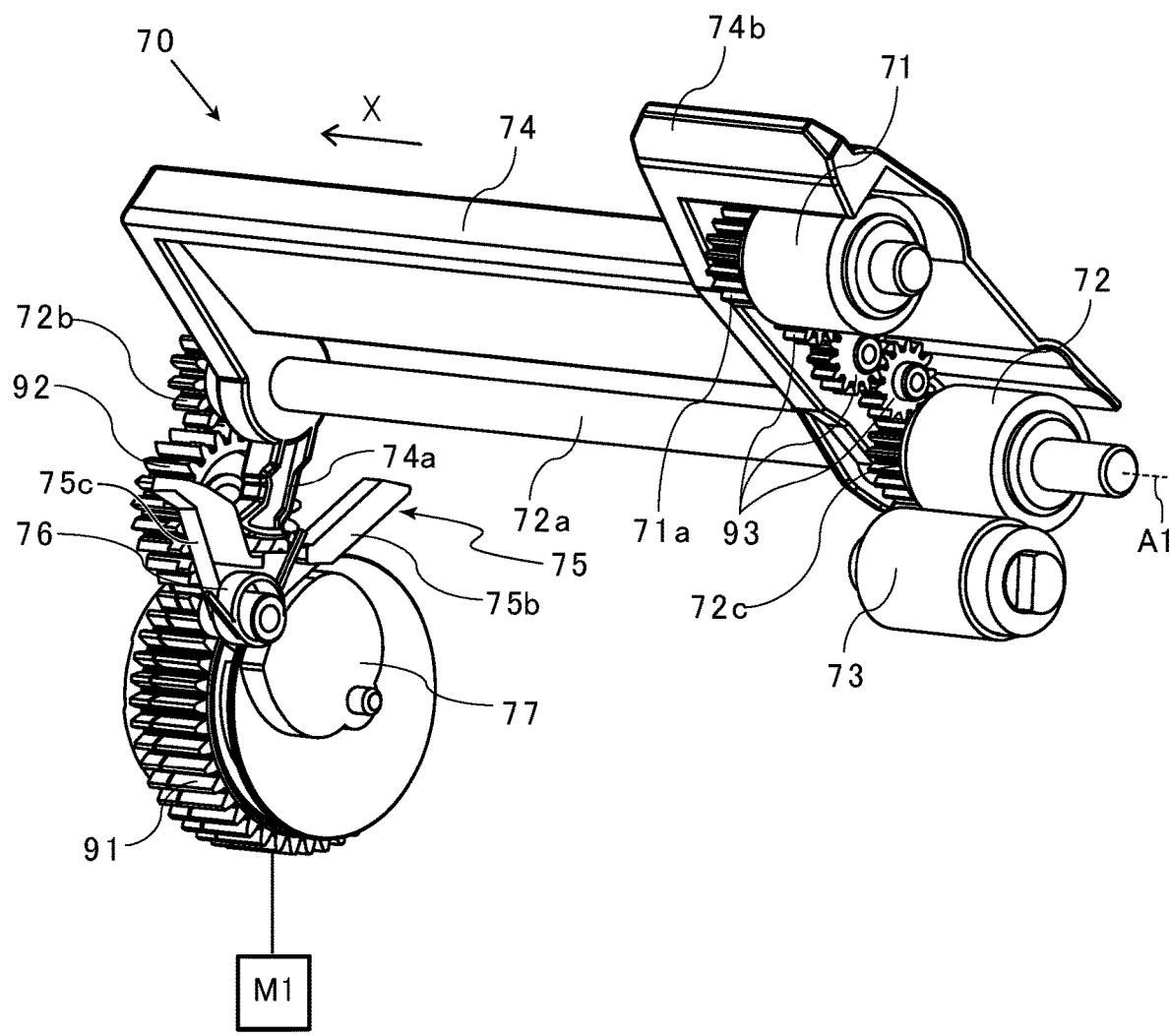
FIG. 2 is a perspective view showing a sheet feeding apparatus relating to the embodiments.

Hereinafter, the manual feed tray type sheet feeding apparatus 70 (sheet feeding apparatus) will be described. FIG. 2 is a perspective view showing the vicinity of the sheet feeding apparatus 70. As shown in FIGS. 1 and 2, the sheet feeding apparatus 70 includes a pickup roller 71, a feed roller 72, a separation roller 73, a lifting arm (swing arm, moving arm) 74. The sheet feeding apparatus 70 is a unit for feeding the sheet stacked on the sheet stacking tray 81 of the door unit 80, described later. The pickup roller 71 is a feed roller of this embodiment, and the lifting arm 74 is a lifting member (swing member, moving member) of this embodiment.

When the sheet S is stacked on the sheet stacking tray 81, the sheet stacking tray 81 is brought into a state where the sheet stacking tray 81 projects toward the outside of the apparatus body 1A from a side surface portion of the apparatus body 1A. By bringing the sheet stacking tray 81 into the state where the sheet stacking tray 81 projects toward the outside of the apparatus body 1A from a side surface portion of the apparatus body 1A, it is allowed to stack the sheet S on the sheet stacking tray 81. The pickup roller 71 comes into contact with an uppermost sheet of the sheet S stacked on the sheet stacking tray 81, and is rotatably driven so as to send out the sheet S in a sheet feeding direction (left direction in the FIG. 1). The feed roller 72 further conveys the sheet S received from the pickup roller 71. The separation roller 73 forms a separation nip by coming into contact with the feed roller 72, and separates the sheet S conveyed by the feed roller 72 from the other sheet S by applying friction force to the sheet passing through the separation nip. Thereafter, the sheet S is sent toward the conveyance roller pair 60 as described above, and fed to the image forming unit 1B.

To be noted, the separation roller 73 described above is, for example, a roller member coupled to a shaft fixed to a frame body of the apparatus body 1A via a torque limiter. Instead of this, as a separation member, it is possible to use a roller which inputs driving force, via a torque limiter, in a direction resisting the rotation of the feed roller 72. Further, it is acceptable to use a pad shaped friction member as the separation member.

A feed roller shaft 72*a* (refer to FIG. 2) supporting the feed roller 72 is rotatably supported by a bearing portion disposed on the apparatus body 1A (refer to FIG. 1). A roller shaft supporting the pickup roller 71 is rotatably supported by the lifting arm 74. The lifting arm 74 is disposed in a liftable (movable, pivotable, swingable) manner with respect to the apparatus body 1A around the feed roller shaft 72*a* as a center, and lifts and lowers the pickup roller 71 such that the pickup roller 71 comes into contact with and is separated from the sheet S on the sheet stacking tray 81. That is, the feed roller 72 is a conveyance roller disposed downstream of the feed roller in the sheet feeding direction and conveying the sheet, and the lifting member pivots around a rotational axis of the conveyance roller as a center. With this configuration, the pickup roller 71 is capable of moving between a feeding position (lower position) coming into contact with the sheet S and a separated position (upper position) separated from the sheet S. That is, the pickup roller 71 and the lifting arm 74 are parts of a moving unit movable with respect to the apparatus body 1A and the sheet stacking tray 81.

Hereinafter, positions of the lifting arm 74 corresponding to the feeding and separated positions of the pickup roller 71 are respectively referred to as the upper and lower positions of the lifting arm 74. That is, the lifting arm 74 is the lifting member pivoting between the lower position where the feed roller comes into contact with the sheet stacked on the sheet stacking portion (sheet whose lower surface is supported by the sheet supporting portion) and the upper position where the feed roller is separated upward from the sheet stacked on the sheet stacking portion. To be noted, the lifting arm 74 pivots between the upper and lower positions in a case where the cartridge door 83 of the door unit 80, described later, is positioned in a closed position and also a cover member 82 is positioned in a stackable position. Further, a lifting operation of the lifting arm 74 is controlled by a lifting control mechanism, described later.

Drive Configuration of Roller

A drive configuration of the sheet feeding apparatus 70 will be described. As shown in FIG. 2, the sheet feeding apparatus 70 includes a partially toothless gear 91 rotatably driven by driving force supplied from a motor M1 (refer to FIG. 1), serving as a drive source, disposed inside of the apparatus body 1A. Further, the sheet feeding apparatus 70 includes an input gear 72b, an output gear 72c, a pickup gear 71a integrally rotating with the pickup roller 71. The feed roller 72, feed roller shaft 72a, input gear 72b, and output gear 72c are disposed on the same axis so as to be rotatably driven integrally. The partially toothless gear 91 and the input gear 72b are coupled to each other via an idler gear 92. Further, the output gear 72c and the pickup gear 71a are coupled to each other via an idler gear 93. The idler gear 93, pickup gear 71a, and idler gear 93 are supported by the lifting arm 74. All of the partially toothless gear 91, idler gear 92, and input gear 72b are supported by the apparatus body 1A, and operate as a drive transmission unit transmitting the driving force of the drive source to the feed roller and the lifting member.

When the partially toothless gear 91 is rotatably driven, rotation is transmitted to the input gear 72b via the idler gear 92, and the output gear 72c and the feed roller 72 are rotatably driven. Further, since the pickup gear 71a disposed at an end of the pickup roller 71 is rotatably driven via the idler gear 93 drivingly coupled to the output gear 72c, also the pickup roller 71 is rotatably driven. To be noted, the partially toothless gear 91 is a gear unit in which two spur gears each having a partially toothless portion are superposed, and the rotation of the partially toothless gear 91 is controllable by an electromagnetic solenoid, not shown. The partially toothless gear 91 is stopped by a regulation portion, not shown, moved by the electromagnetic solenoid in a state where a toothless section faces a gear, not shown, rotatably driven by the motor M1. One side of the spur gears of the partially toothless gear 91 is urged to a gear, not shown. Every time when a trigger is input to the electromagnetic solenoid, the regulation portion moves, and a tooth section of the urged spur gear engages with the gear, not shown. Then, the partially toothless gear 91 is rotatably driven once, and the feed roller 72 and the pickup roller 71 are rotatably driven by the rotation of the partially toothless gear 91. The regulation portion regulates the partially toothless gear 91 again such that the partially toothless gear 91 is stopped after having rotated once.

Lifting Control Mechanism

Figure 3:
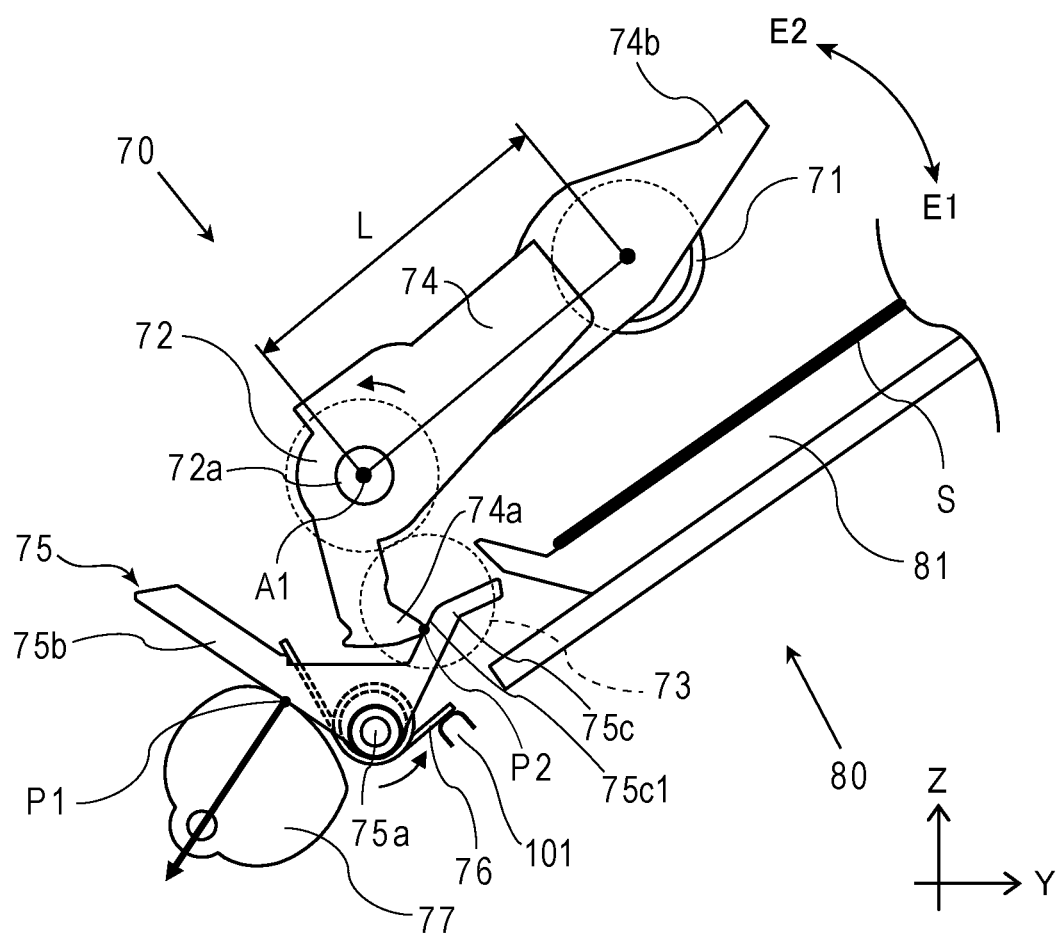
FIG. 3 is a schematic diagram for explaining an operation of the sheet feeding apparatus relating to the embodiments.
Figure 4:
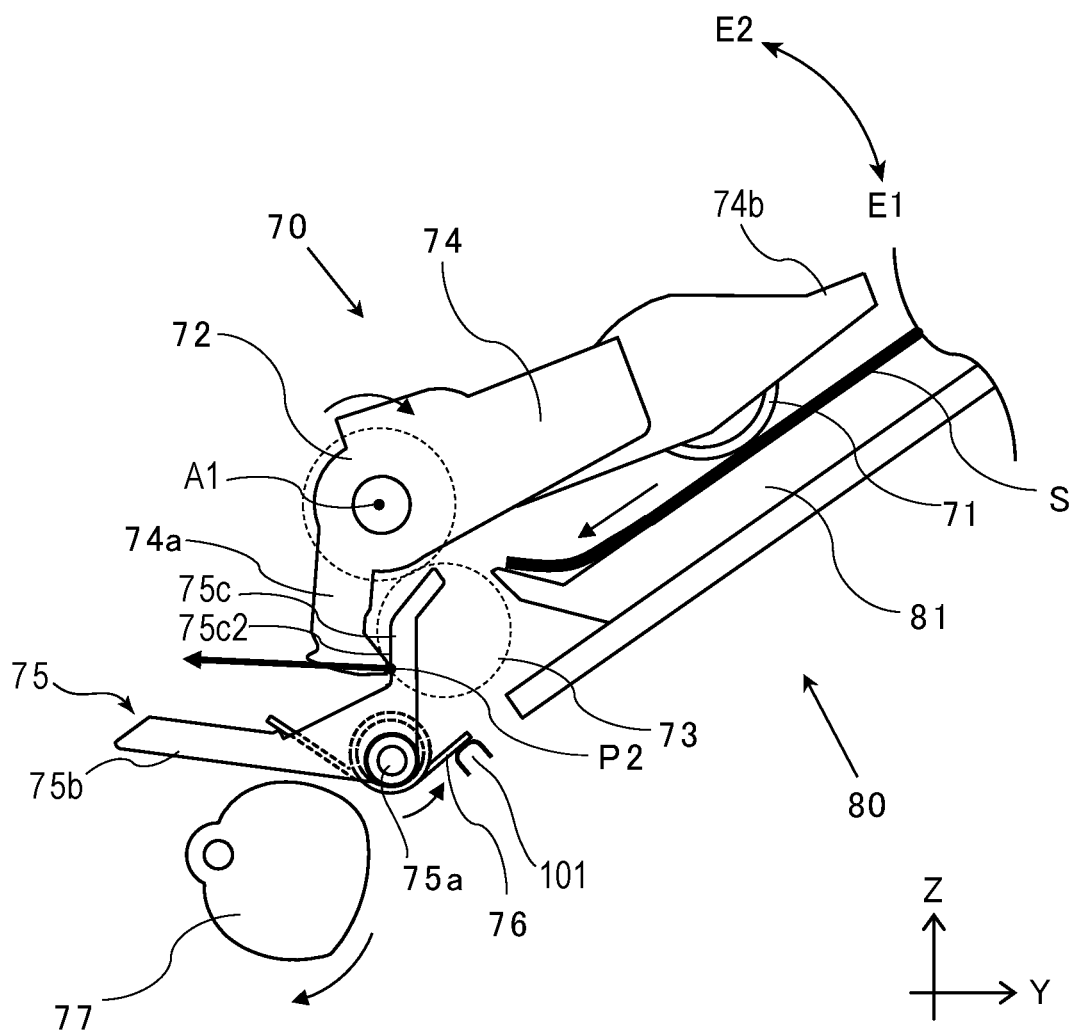
FIG. 4 is a schematic diagram for explaining the operation of the sheet feeding apparatus relating to the embodiments.

Next, using FIGS. 2 to 4, a configuration of a lifting control mechanism lifting and lowering the pickup roller 71 will be described. FIGS. 3 to 4 are perspective views showing part of the sheet feeding apparatus 70, when viewed from a downstream side in the X direction which is a rotational axis direction of the pickup roller 71 (nip width direction of the separation nip, sheet width direction, refer to FIG. 2). FIG. 3 shows a state where the pickup roller 71 is in the separated position, and FIG. 4 shows a state where the pickup roller 71 is in the feeding position.

As shown in FIG. 2, the sheet feeding apparatus 70, serving as the lifting control mechanism, includes a cam (regulation member) 77, a pressing spring 76, and a pressing lever 75. The cam 77 is disposed on the same axis as the partially toothless gear 91, and rotates with the partially toothless gear 91.

As shown in FIGS. 2 and 3, the pressing lever 75, serving as a transmission portion (transmission member) of this embodiment, is supported by the apparatus body 1A, and is pivotable around a shaft 75a, approximately parallel to the feed roller shaft 72a, as a center. In other words, the pressing lever 75 is pivotable around an axis different from and substantially parallel to an axis A1 (center of the feed roller shaft 72a) which is a pivot axis (swing axis) of the lifting arm 74. The pressing lever 75 includes a cam contact portion 75b coming into contact with a cam surface (outer circumferential surface) of the cam 77, and an arm contact portion 75c coming into contact with a projection portion 74a which is a contacted portion of the lifting arm 74. The cam 77 is movable between a regulating position, by coming into contact with the cam contact portion 75b of the pressing lever 75, regulating a position of the pressing lever 75 urged with the pressing spring 76 and a released position receded from the regulating position. In this embodiment, when the cam 77 is in the released position, the cam 77 is separated from the cam contact portion 75b of the pressing lever 75.

The pressing spring 76, serving as an urging portion (urging member), urges the pressing lever 75 in a predetermined pivoting direction so as to urge the lifting arm 74 to the lower position via the pressing lever 75. In this embodiment, a torsion coil spring attached around the shaft 75a of the pressing lever 75 is used as the pressing spring 76. One end of this pressing spring 76 is attached to a spring hook 101, and the other end is attached to a spring hook of the pressing lever 75. The pressing spring 76 generates the force to rotate the pressing lever 75 (in a counter-clockwise direction in FIG. 3). The pressing spring 76 generates the force to rotate the pressing lever 75 in a direction in which the cam contact portion 75b of the pressing lever 75 approaches the cam 77.

Hereinafter, among moving directions (pivoting directions, swing directions) of the lifting arm 74, a direction in which the pickup roller 71 moves (downward) from the separated position to the feeding position is referred to as an E1 direction. Further, a direction in which the pickup roller 71 moves (upward) from the feeding position to the separated position is referred to as an E2 direction. In other words, the E1 direction is a direction in which the pickup roller 71 approaches the sheet stacking tray 81, and the E2 direction is a direction in which the pickup roller 71 is separated (receded) from the sheet stacking tray 81.

Before the start of a sheet feeding operation, as shown in FIG. 3, the cam 77 is in the regulating position. The pickup roller 71 is held in the separated position, and separated upward from the sheet stacking tray 81 and the sheet S. In this state, the cam 77 and the pressing lever 75 come into contact with each other at a point P1, and the pressing lever 75 and the lifting arm 74 come into contact with each other at a point P2, so that a position of the lifting arm 74 is held. That is, the pressing lever 75 urged by the pressing spring 76 is caught by bringing the cam 77 and the cam contact portion 75b of the pressing lever 75 into contact with each other at the point P1, so that the pressing lever 75 is held in position. Further, the lifting arm 74 is urged in the E2 direction by an arm urging spring (own weight cancellation spring), not shown. In this state, the projection portion 74a of the lifting arm 74 comes into contact with the arm contact portion 75c of the pressing lever 75, so that the lifting arm 74 is held in the upper position.

To be noted, the force of the arm urging spring is set at a value slightly larger than the force pivoting the lifting arm 74 to the E1 direction by the own weight of the lifting arm 74 and members supported by the lifting arm 74. The moment of the force applied to the lifting arm 74 in the E2 direction by the arm urging spring is adequately smaller than a maximum value of the moment of the force possibly applied to the lifting arm 74 by the pressing spring 76 in the E1 direction. Therefore, the pressing lever 75 does not pivot from the position shown in FIG. 3 in a clockwise direction in FIG. 3, and, in a state coming into contact with the cam 77 at the point P1, holds the lifting arm 74 in the position shown in FIG. 3 resisting the urging force of the arm urging spring. Since the pickup roller 71 is held in the separated position as described above, a user can easily set the sheet S on the sheet stacking tray 81.

At the execution of the sheet feeding operation, as shown in FIG. 4, the cam 77 moves to the released position. That is, at the start of the sheet feeding operation, the trigger is input into the electromagnetic solenoid as described above, so that the partially toothless gear 91 (refer to FIG. 2) starts rotation. Then, the cam 77 is rotatably driven in a clockwise direction in FIG. 4 along with the partially toothless gear 91, and the cam surface of the cam 77 recedes from the cam contact portion 75b of the pressing lever 75. Then, the pressing lever 75 pivots in a counter-clockwise direction in FIG. 4 by the urging force of the pressing spring 76. Along with the pivoting of the pressing lever 75, the projection portion 74a of the lifting arm 74 is pressed to the arm contact portion 75c, and the lifting arm 74 moves in the E1 direction. Then, when the pickup roller 71 comes into contact with the sheet S, the movement of the lifting arm 74 in the E1 direction is stopped. The cam surface of the cam 77 recedes from the pressing lever 75 during the movement of the lifting arm 74 in the E1 direction.

As shown in FIG. 4, in the state where the pickup roller 71 comes into contact with the sheet S, the pressing lever 75 is urged in the counter-clockwise direction in FIG. 4, so that the arm contact portion 75c of the pressing lever 75 comes into contact with the projection portion 74a of the lifting arm 74 at the point P2. By the force of the pressing lever 75 pressing the lifting arm 74, the lifting arm 74 is urged toward the E1 direction, so that the force for bringing the pickup roller 71 into contact with the sheet S is generated. In other words, the urging force of the pressing spring 76, serving as the urging member, is transmitted to the lifting arm 74 via the pressing lever 75, serving as a transmission member, so that an appropriate feed pressure of the pickup roller 71 (feed roller) is ensured. To be noted, as described above, the moment applied to the lifting arm 74 in the E2 direction by the arm urging spring is smaller than the moment applied to the lifting arm 74 in the E1 direction by the pressing spring 76. The urging force of the pressing spring 76 is set such that the pickup roller 71 is able to come into contact with the sheet S at the appropriate pressure while resisting the urging force of the arm urging spring.

In parallel with the movement of the pickup roller 71 to the feeding position, the pickup roller 71 and the feed roller 72 are rotatably driven by the drive transmission via the gear train described above. By the rotation of the pickup roller 71 and the feed roller 72, one sheet of the sheet S is fed from the sheet stacking tray 81. Thereafter, the cam 77 comes into contact with the pressing lever 75 again, so that the pressing lever 75 pivots in the clockwise direction in FIG. 4 from the position shown in FIG. 4. Along with the pivoting of the pressing lever 75, the lifting arm 74 swings in the E2 direction by the arm urging spring, so that the pickup roller 71 returns from the feeding position to the separated position. Then, since the cam 77 rotates once from a state before the start of the sheet feeding operation, the sheet feeding apparatus 70 returns to the state shown in FIG. 3.

Configuration of Door Unit

Figure 5:
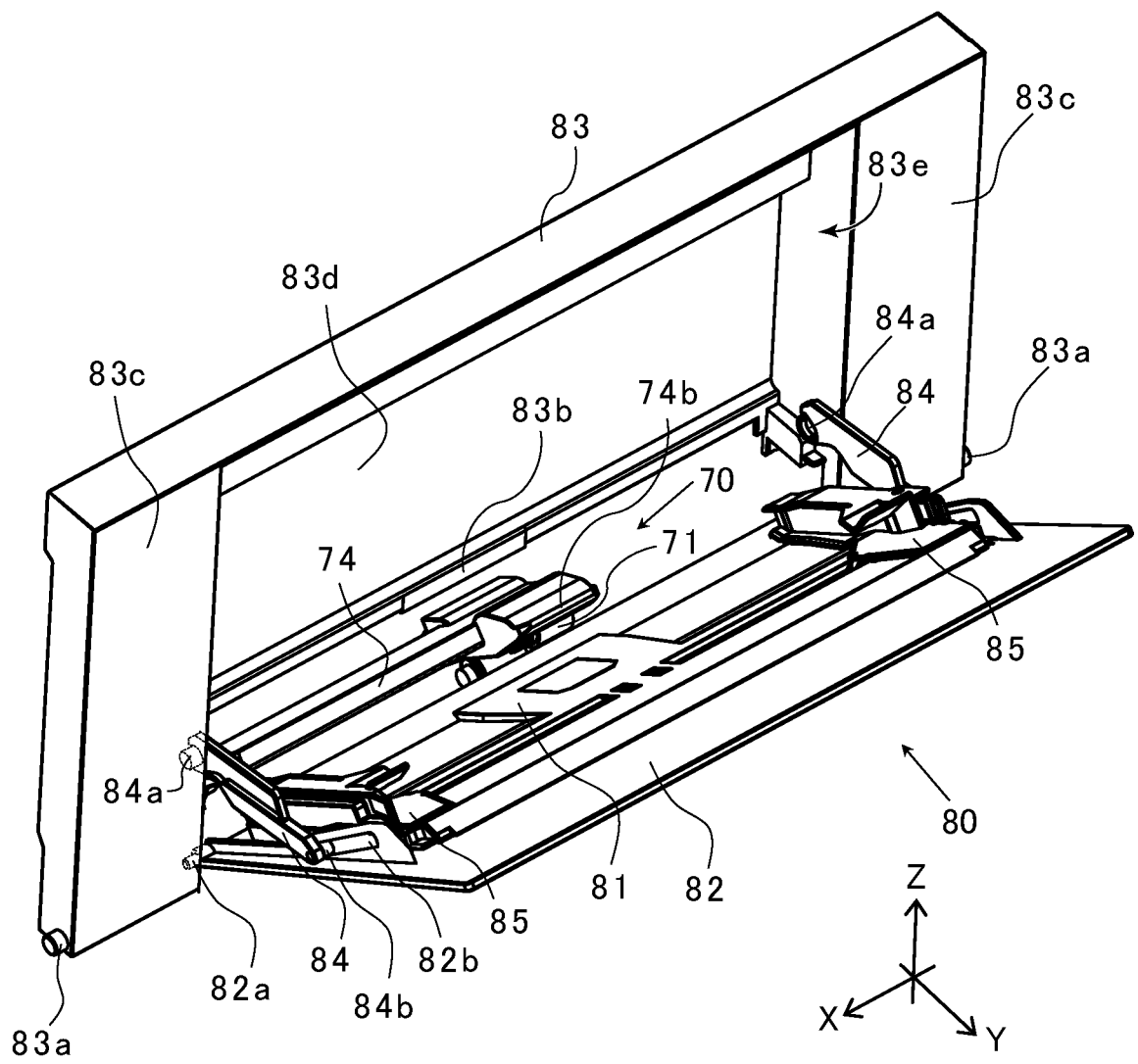
FIG. 5 is a perspective view showing a side surface portion of the image forming apparatus relating to the embodiments.

Using FIGS. 5 to 8, the door unit 80 of the image forming apparatus 1 will be described. FIG. 5 is a perspective view showing the door unit 80 and the vicinity thereof. As shown in FIGS. 1 and 5, the door unit 80 is disposed on a side surface portion of the image forming apparatus 1 in the Y direction along with the manual feed type sheet feeding apparatus 70. The door unit 80 includes the cartridge door 83, the cover member 82 on which the sheet stacking tray 81 is disposed, a door link 84 coupling the cartridge door 83 and the cover member 82 to each other in a relatively movable manner.

A door supporting point 83a of the cartridge door 83 disposed at a lower end is supported by the apparatus body 1A, and the cartridge door 83 is pivotably disposed with respect to the apparatus body 1A around an axis extending in the X direction passing through the door supporting point 83a. As shown in FIGS. 1 and 5, the cartridge door 83 moves between a position (i.e., closed position), in which the posture of the cartridge door 83 becomes along a side surface portion 1R of the apparatus body 1A, and a position (i.e., opened position), in which the cartridge door 83 has pivoted in the Y direction and downward from the closed position so as to be separated from the side surface portion 1R of the apparatus body 1A. In a state where the cartridge door 83 is in the closed position, an exterior surface 83c (opposite to a surface facing the apparatus body 1A) of the cartridge door 83 is included in an exterior of the apparatus body 1A in the Y direction.

Figure 6:
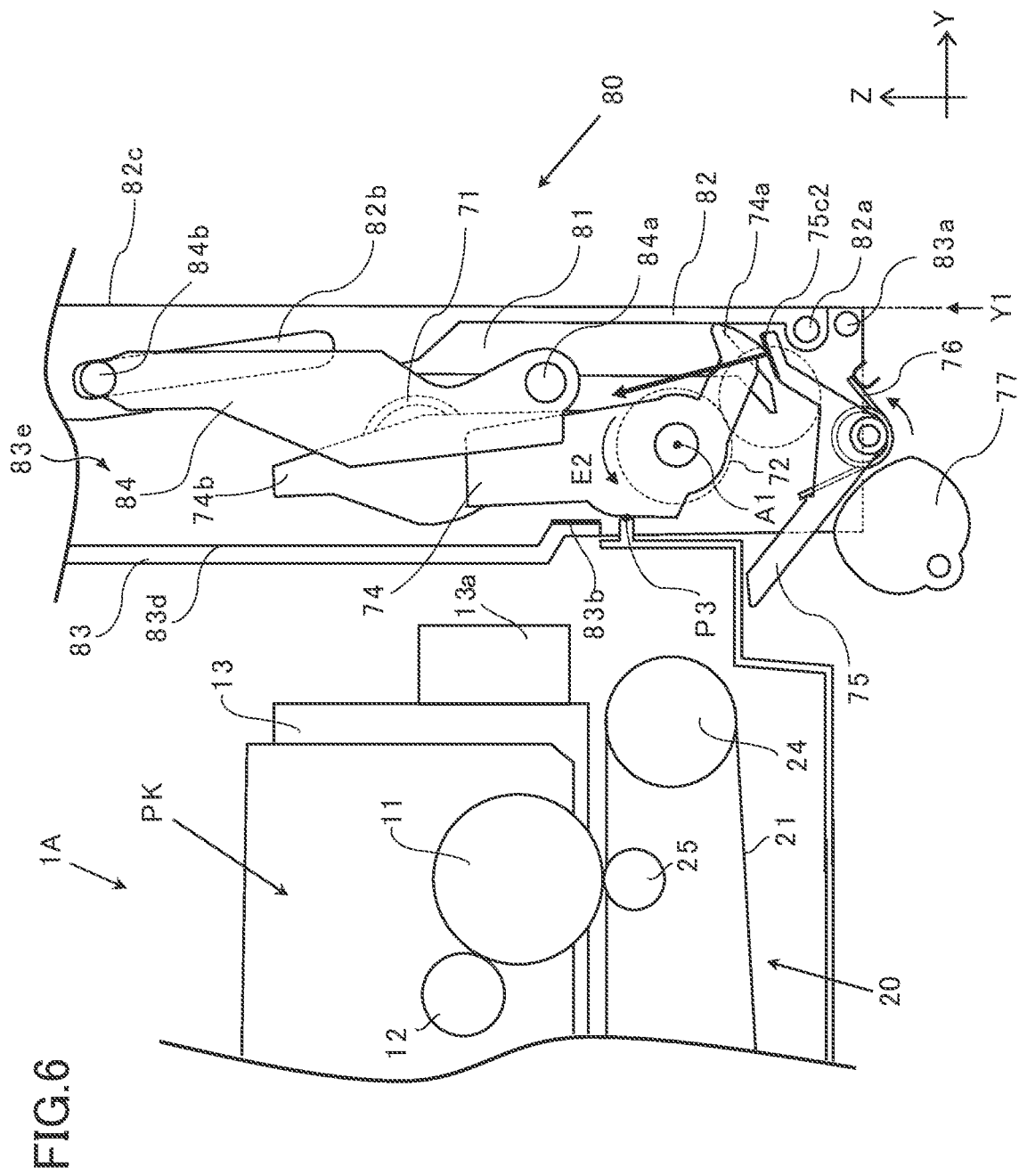
FIG. 6 is a schematic diagram showing a cross-sectional configuration of a door unit for a case where a cartridge door is positioned in a closed position.

The closed position of the cartridge door 83 of this embodiment is a position in which, in a case viewing the image forming apparatus 1 in the X direction, the exterior surface 83c becomes approximately vertical (refer to FIG. 6). Further, the opened position of the cartridge door 83 of this embodiment is a position in which the cartridge door 83 has pivoted approximately ninety degrees in the clockwise direction in FIG. 1 from the closed position, that is, a position in which the exterior surface 83c becomes approximately horizontal (refer to FIG. 8).

An opening 10 (refer to FIG. 1) allowing attachment and detachment of the process cartridges PY, PM, PC, and PK and the cartridge tray 13 to and from the apparatus body 1A in the Y direction is disposed in the side surface portion 1R of the apparatus body 1A. The closed position of the cartridge door 83 is a position covering the opening 10, and is a position in which the image forming apparatus 1 is capable of performing the image forming operation. On the other hand, when the cartridge door 83 moves to the opened position, the opening 10 is exposed, and it is allowed to draw and insert the process cartridges PY, PM, PC, and PK and the cartridge tray 13 from and into the apparatus body 1A along the Y direction via the opening 10. That is, the opened position of the cartridge door 83 is a position in which the opening 10 is exposed, and a position for attaching and detaching the process cartridges PY, PM, PC, and PK to and from the apparatus body 1A.

A cover supporting point 82a of the cover member 82 disposed at a lower end is supported by the cartridge door 83, and the cover member 82 is pivotably disposed with respect to the cartridge door 83 around an axis extending in the X direction passing through the cover supporting point 82a. That is, the cover member 82 supports the sheet stacking tray 81, serving as the sheet stacking portion (sheet supporting portion), and is openable with respect to the cartridge door 83, serving as an opening/closing member. The cover member 82 moves between a stored position (closed position) stored in a space 83e disposed in the cartridge door 83 and a stackable position (opened position, the position shown in FIG. 5) projecting in the Y direction (that is, direction toward an upstream side in the sheet feeding direction) with respect to the cartridge door 83. That is, the cover member 82 is movable to the stored position and the stackable position in a state where the opening/closing member is positioned in the closed position. The stored position is a position in which the cover member is stored in the space disposed in the opening/closing member so as to constitute a part of the side surface of the image forming apparatus 1. The stackable position is a position in which the cover member projects toward the outside of the image forming apparatus with respect to the opening/closing member so as to make it possible to stack the sheet on the sheet stacking portion (sheet supporting portion).

A concave portion 83d recessed into an upstream side of the exterior surface 83c in the Y direction, using a state where the cartridge door 83 is positioned in the closed position (refer to FIG. 5) as a reference, is formed in the cartridge door 83. The space 83e in the cartridge door 83 is a space formed by the concave portion 83d and disposed upstream of the exterior surface 83c in the Y direction. In a state where the cartridge door 83 and the cover member 82 are respectively located in the closed and stored positions, a side surface 82c of the cover member 82 in the Y direction is approximately flush with the exterior surface 83c of the cartridge door 83. That is, the side surface of the image forming apparatus 1 in the Y direction is constituted by the side surface 82c of the cover member 82 and the exterior surface 83c of the cartridge door 83. To be noted, a bottom surface portion of the concave portion 83d is a portion covering the opening 10 of the apparatus body 1A, and an arm pressing portion 83b, described later, is disposed at a lower end of the concave portion 83d.

Further, since the cover member 82 is supported by the cartridge door 83, the cover member 82 is pivotably disposed with respect to the apparatus body 1A around the door supporting point 83a as a center. The door link 84 couples the cover member 82 and the cartridge door 83 to each other, and regulates a pivoting range of the cover member 82 with respect to the cartridge door 83. A link supporting point 84a disposed at a first end of the door link 84 in a longitudinal direction is supported by the cartridge door 83, and the door link 84 is pivotable with respect to the cartridge door around an axis extending in the X direction passing through the link supporting point 84a. Further, at a link shaft 84b (projection) disposed at a second end of the door link 84 in the longitudinal direction, the door link 84 slidably engages with a groove 82b disposed in the cover member 82.

In a case where the cover member 82 is positioned in the stackable position, the link shaft 84b abuts onto a first end of the groove 82b so as to regulate the pivoting of the cover member 82 in an opening direction (downward), so that the cover member 82 is held in the stackable position. When the cover member 82 is closed from the stackable position to the stored position, the link shaft 84b is separated from the first end of the groove 82b mentioned above, and slides inside of the groove 82b. Thereby, a difference in pivoting trajectories due to a difference in pivoting axes (cover and door supporting points 82a and 83a) of the cover member 82 and the cartridge door 83 is absorbed.

To be noted, while, in the perspective view of FIG. 5, the link shaft 84b, the groove 82b and the cover supporting point 82a disposed only on one side in the X direction are indicated, these elements are also disposed on the other side in the X direction. That is, both ends of the cover member 82 in the X direction are supported by the cartridge door 83 via the pair of cover supporting points 82a and the pair of door links 84.

The sheet stacking tray 81 is supported by a surface on an inner side (surface on an upper side in the state where the cover member 82 is positioned in the stackable position) of the cover member 82. Further, a pair of width regulation members 85 (side edge regulation member) regulating a position of the sheet S stacked on the sheet stacking tray 81 in the sheet width direction (X direction) are attached to the cover member 82. The width regulation members 85 are disposed symmetrically with respect to the center position of the pickup roller 71 as a reference, and move in the X direction in a manner interlocked with each other. To be noted, in the drawings other than FIG. 5, an illustration of the width regulation member 85 is omitted.

Further, as shown in FIG. 5, the lifting arm 74 includes a projection portion 74b, and the cartridge door 83 includes the arm pressing portion 83b, serving as a pressing portion pressing the lifting arm 74. The projection portion 74b is disposed as a pressed portion pressed by the arm pressing portion 83b. Detailed operations of the projection portion 74b and the arm pressing portion 83b will be described below.

With the configuration described above, the door unit 80 of this embodiment is able to take at least three different states, that is, a state (a first state, refer to FIG. 6) where the cartridge door 83 and the cover member 82 are respectively positioned in the closed and stored positions, a state (a second state, refer to FIGS. 1 and 5) where the cartridge door 83 and the cover member 82 are respectively positioned in the closed and stackable positions, and a state (a third state, refer to FIG. 8) where the cartridge door 83 and the cover member 82 are respectively located in the opening and stored positions. The first state is a state taken in a case where the manual feed type sheet feeding apparatus 70 is not used. The second state is a state taken for performing the image forming operation using the manual feed type sheet feeding apparatus 70. The third state is a state, as described later, taken so as to make it possible to draw and insert the cartridge tray 13 from and into the apparatus body 1A in a case performing the exchange of process cartridges PY, PM, PC, and PK, and the like.

Operation at Opening Cartridge Door

Hereinafter, an operation of the door unit 80 performed at the time moving the cartridge door 83 from the opened position to the closed position will be described referring to FIGS. 6 to 8. To be noted, in the following descriptions, the cover member 82 is positioned in the stored position with respect to the cartridge door 83.

FIG. 6 is a schematic diagram showing a cross-sectional configuration of the door unit 80 for a case cut at a flat plane vertical to the X direction in a case where the cartridge door 83 is positioned in the closed position. In a state where the cover member 82 is positioned in the stored position, the sheet stacking tray 81, the door link 84, the pickup roller 71, and also the lifting arm 74 are accommodated in the space 83e, and positioned between the cartridge door 83 and the cover member 82. That is, the sheet stacking tray 81, the door link 84, the pickup roller 71, and the lifting arm 74 are positioned upstream of a Y direction side surface position Y1 of the image forming apparatus 1 in the Y direction (inside of the image forming apparatus). In other words, in a case where the opening/closing member and the cover member are respectively positioned in the closed and stored positions, the lifting member and the supply motor are stored between the opening/closing member and the cover member. In this embodiment, in a state where the cartridge door 83 is positioned in the closed position, in the vertical direction, at least part of the pickup roller 71 is positioned above lower ends of the process cartridges PY to PK and a lower end of the cartridge tray 13. In the state where the cartridge door 83 is positioned in the closed position, in the vertical direction, at least part of the pickup roller 71 is positioned above upper ends of the photosensitive drums 11.

At this point, the side surface position Y1 mentioned above is a position of the side surface of the image forming apparatus 1 when viewed in the X direction in the state where the cartridge door 83 and the cover member 82 are respectively positioned in the closed and stored positions. Further, the process cartridges PY to PK, the cartridge tray 13 storing the process cartridges PY to PK, and the intermediate transfer belt unit 20 inside of the apparatus body 1A are positioned upstream of the concave portion 83d of the cartridge door 83 in the Y direction.

In the state shown in FIG. 6, the lifting arm 74 is in a posture extending approximately in the vertical direction from an axis A1 that is a pivot axis. That is, the pickup roller 71 is positioned above the axis A1, overlaps the axis A1 when viewed in the vertical direction. In other words, in the state where the opening/closing member and the cover member are respectively positioned in the closed and stored positions, the feed roller is positioned above the axis of the lifting member, and overlaps the lifting member when viewed in the vertical direction. With this configuration, it is possible to miniaturize the image forming apparatus 1 in the Y direction in a state where the cartridge door 83 and the cover member 82 are closed.

Further, the projection portion 74a of the lifting arm 74 comes into contact with the arm contact portion 75c of the pressing lever 75. At this point, first and second surfaces 75c1 and 75c2, serving as a contact surface coming into contact with the projection portion 74a of the lifting arm 74, different in angles when viewed in the X direction (rotational axis direction of the pressing lever 75) are disposed in the arm contact portion 75c.

The second surface 75c2 is a surface with which the projection portion 74a comes into contact when the cover member 82 is positioned in the stored position. The second surface 75c2 is disposed such that an action line of the pressing force pressing the projection portion 74a passes above the axis A1 of the lifting arm 74 in the state shown in FIG. 6 (state where the cartridge door 83 and the cover member 82 are respectively in the closed and stored positions). In other words, in the state shown in FIG. 6, a direction of the second surface 75c2 is set such that the moment for pivoting the lifting arm 74 in the E2 direction by the urging force of the pressing spring 76 is caused to act on the lifting arm 74. The lifting arm 74 urged in the E2 direction which is a direction toward the apparatus body 1A is positioned by abutting onto an abutment portion P3 disposed on a part of a frame body of the apparatus body 1A. As described above, in this embodiment, the lifting arm 74 is abutted onto the apparatus body 1A with which it is easier to ensure stiffness by use of a metal frame and the like in comparison with the cover member 82 with which ensuring the stiffness is limited in view of an increase in the size of the apparatus, a weight stack applied to the cover supporting point 82a, and the like. Thereby, even in a case where the door unit 80 is kept in the state shown in FIG. 6 for a long time, the creep deformation of the cover member 82 becomes less likely to occur.

To be noted, the first surface 75c1 is a surface coming into contact with the projection portion 74b of the lifting arm 74 when the cover member 82 is positioned in the stackable position (refer to FIGS. 3 and 4). The first surface 75c1 is disposed such that the action line of the force pressing the projection portion 74a passes below the axis A1 of the lifting arm 74 in the states shown in FIGS. 3 and 4 (states where the cartridge door 83 and the cover member 82 are respectively in the closed and stackable position). In other words, a direction of the first surface 75c1 is set such that the moment for pivoting the lifting arm 74 in the E1 direction (moment pressing the pickup roller 71 toward the sheet S) by the urging force of the pressing spring 76 is caused to act on the lifting arm 74.

Figure 7:
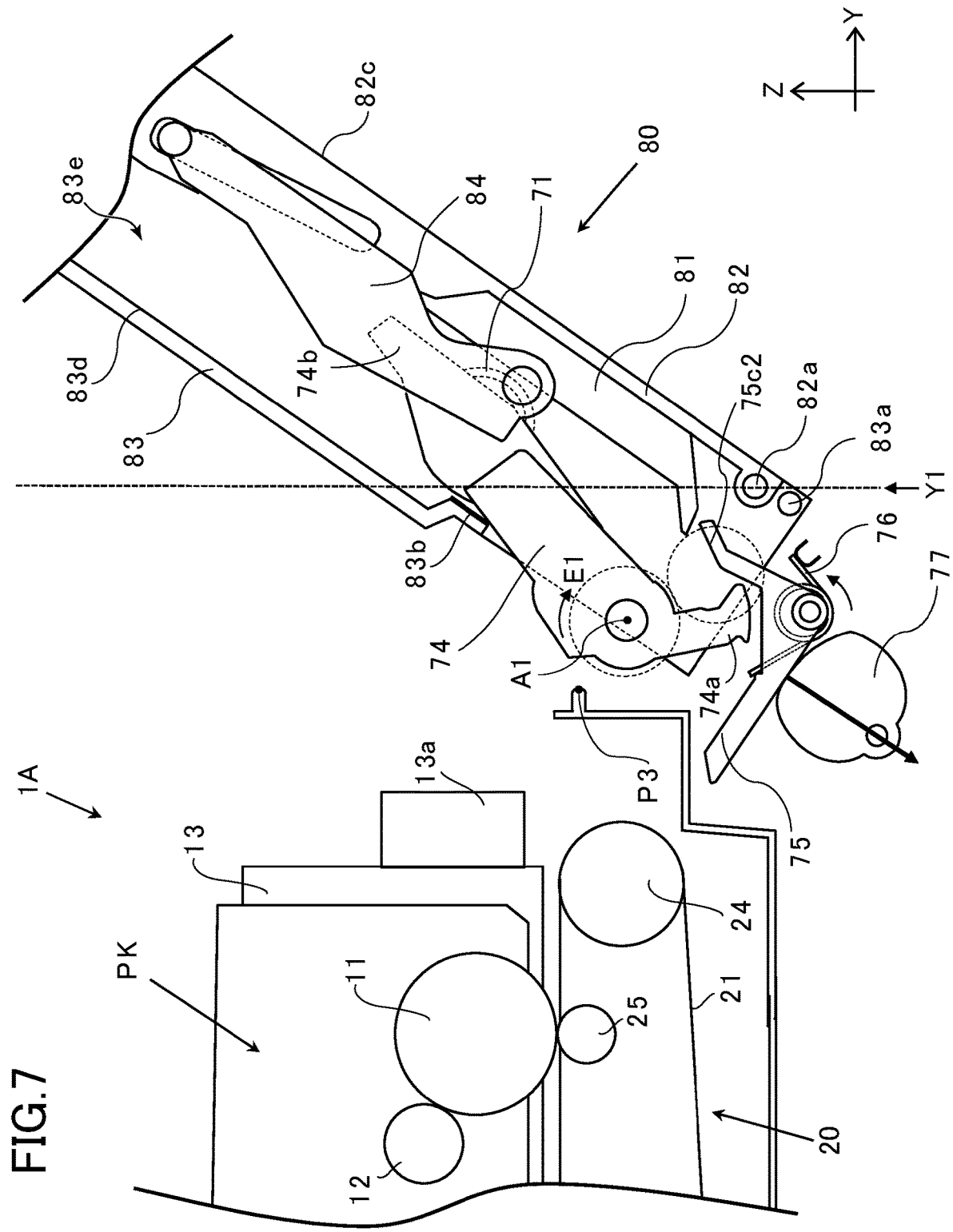
FIG. 7 is a schematic diagram showing a cross-sectional configuration of the door unit for a case where the cartridge door is positioned between the closed position and an opened position.

FIG. 7 is a schematic diagram showing a cross-sectional configuration of the door unit 80 for a case cut at a flat plane vertical to the X direction in a case where the cartridge door 83 is positioned between the closed and opened positions. As described above, in the state where the cartridge door 83 is positioned in the closed position, the second surface 75c2 of the pressing lever 75 presses the projection portion 74a of the lifting arm 74 so as to urge the lifting arm 74 in the E2 direction, so that the lifting arm 74 is positioned (refer to FIG. 1). In a process where the user holds the cartridge door 83 so as to pivot the cartridge door 83 around the door supporting point 83a as a center, the arm pressing portion 83b of the cartridge door 83 comes into contact with the lifting arm 74, and presses the lifting arm 74 in a downward direction (E1 direction). In other words, the arm pressing portion 83b, serving as a pressing portion, comes into contact with the lifting member in a process where the opening/closing member moves from the closed position to the opened position, and presses the opening/closing member toward the outside of a movement locus.

At the time when the lifting arm 74 pivots by a predetermined angle in the E1 direction, the projection portion 74a of the lifting arm 74 is separated from the second surface 75c2 of the pressing lever 75, and released from the urging force of the pressing spring 76. The pressing lever 75 pivots in a counter-clockwise direction in FIG. 7, and comes into contact with the cam 77, so that the urging force of the pressing spring 76 is caught by the cam 77. Further, since the lifting arm 74 is urged in the E2 direction by the arm urging spring (own weight cancellation spring) described above, the lifting arm 74 pivots in the counter-clockwise direction along with the cartridge door 83 in a state coming into contact with the arm pressing portion 83b.

As described above, when the cartridge door 83 is opened, except for a predetermined short period, the urging force of the pressing spring 76 does not act in a direction preventing the pivoting of the cartridge door 83. The short period mentioned above is a period from the time when the arm pressing portion 83b has come into contact with the lifting arm 74 to the time when the lifting arm 74 is separated from the second surface 75c2 of the pressing lever 75. Therefore, while, in the state shown in FIG. 6, the urging force of the pressing spring 76 is caught by the side of the apparatus body 1A, it is possible to reduce increase in an operation stack for opening the cartridge door 83 due to the urging force of the pressing spring 76.

Figure 8:
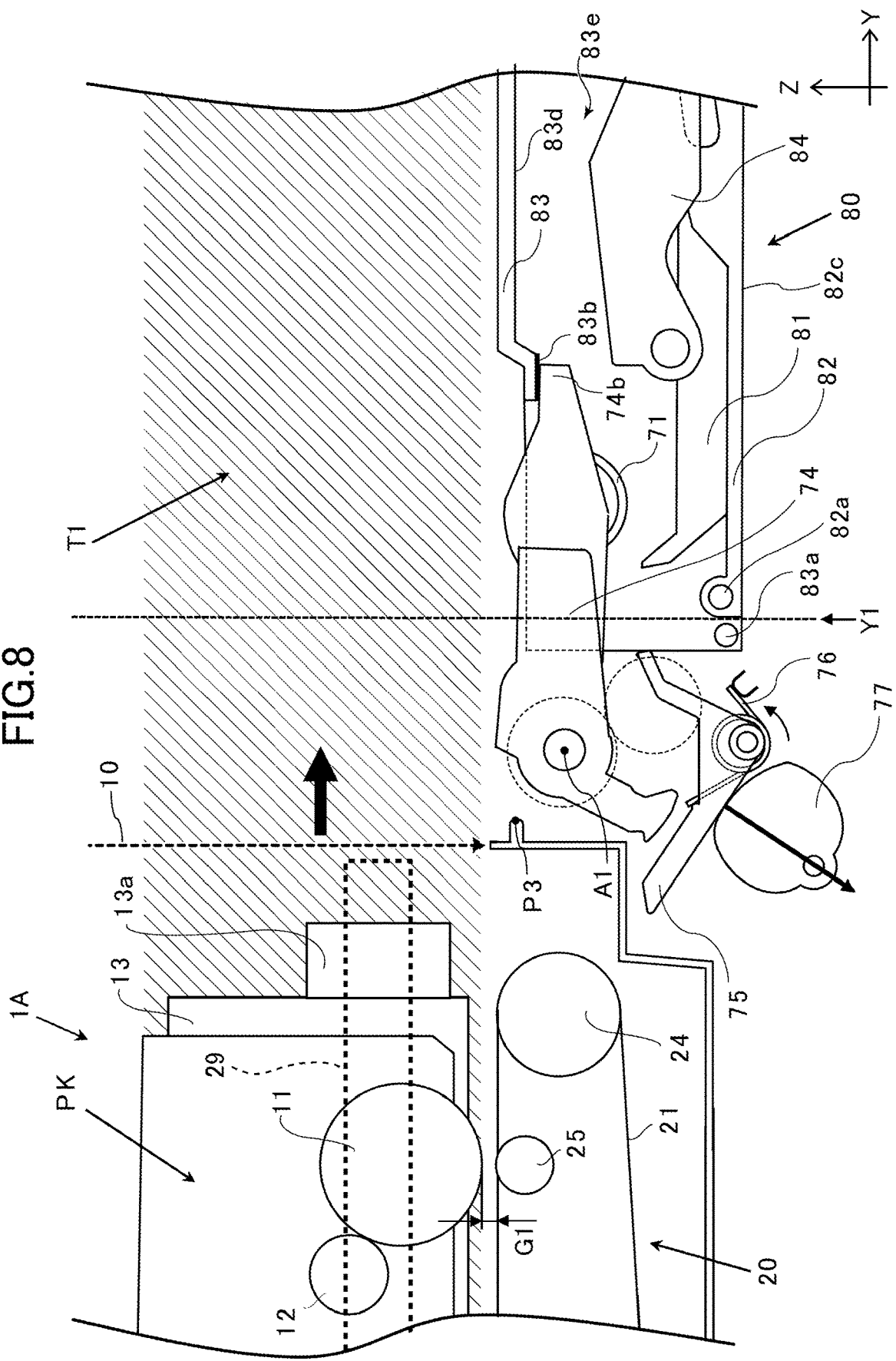
FIG. 8 is a schematic diagram showing a cross-sectional configuration of the door unit for a case where the cartridge door is positioned in the opened position.

FIG. 8 is a schematic diagram showing a cross-sectional configuration of the door unit 80 for a case cut at a flat plane vertical to the X direction in the case where the cartridge door 83 is positioned in the closed position. As described above, each of the cartridge door 83 and the lifting arm 74 is pivotably supported by the apparatus body 1A. Further, the pivot axis (first axis) of the cartridge door 83 and the pivot axis (axis A1, second axis) of the lifting arm 74 are parallel to each other, and are in positions different to each other when viewed in the X direction. Therefore, the larger an amount of the pivoting of the cartridge door 83 from the closed position becomes, the closer to a side of the distal end of the lifting arm 74 (to a side receding from the axis A1) a contact position of the arm pressing portion 83b with the lifting arm 74 changes.

At this point, the lifting arm 74 of this embodiment includes the projection portion 74b projecting upstream of the pickup roller 71 in the sheet feeding direction. In other words, the lifting arm 74 includes the projection portion projecting farther in a radial direction with respect to the second axis (A1) than a distal end position of the feed roller in the radial direction. Therefore, even in a case where the contact position of the arm pressing portion 83b passes a position of the pickup roller 71 during an opening operation of the cartridge door 83, the disengagement of the lifting arm 74 from the arm pressing portion 83b is prevented. Then, even in a state where the cartridge door 83 reaches the opened position, the arm pressing portion 83b comes into contact with the projection portion 74b so as to regulate the movement of the lifting arm 74, so that the lifting arm 74 is held in a position outside of a cartridge detachment locus T1 described later (outside of the movement locus).

In the state where the cartridge door 83 reaches the opened position, at least part of the lifting arm 74 is exposed toward a space above the cartridge door 83 (space through which the cartridge tray 13 and the process cartridges PY to PK pass). Thereby, in comparison with a configuration in which the cartridge door 83 covers the whole of the lifting arm 74 in a state where the cartridge door 83 is positioned in the opened position, it becomes easier to dispose the cartridge door 83 and the lifting arm 74 in a manner avoiding the interference in the cartridge detachment locus T1. Preferably, in the state where the cartridge door 83 is positioned in the opened position, in positions of the rotational axes of the pickup roller 71 and/or the feed roller 72 in the Y direction, the lifting arm 74 is exposed to the space above the cartridge door 83. Thereby, in a case where the lifting arm 74 includes a cover portion covering outer circumferential surfaces of the pickup roller 71 and the feed roller 72 from above, it becomes easier to dispose the cartridge door 83 and the lifting arm 74 in the manner avoiding the interference in the cartridge detachment locus T1.

In this embodiment, along with the movement of the cartridge door 83 to the opened position, the cartridge tray 13 moves upward by a mechanism not shown so as to separate the photosensitive drums of the process cartridges PY to PK from the intermediate transfer belt 21, so that a gap G1 is formed. After the pivoting of the cartridge door 83 to the opened position has been completed, the user draws the cartridge tray 13 in the Y direction by holding a holding portion 13a of the cartridge tray 13. At this time, the cartridge tray 13 is moved approximately in the Y direction by being guided with guide rails 29 (guide member) disposing both side portions thereof in the X direction on the apparatus body 1A and extending approximately in the Y direction.

At this point, the movement locus (passing area, passing space) through which the cartridge passes at the time of attaching and detaching the cartridge to and from the apparatus body 1A is referred to as the cartridge detachment locus. The cartridge detachment locus T1 of this embodiment is indicated by the hatching area in FIG. 8. The cartridge detachment locus T1 is a space spreading from the opening 10 in the side surface portion 1R of the apparatus body 1A toward the outside of the apparatus body 1A in the Y direction. Since, in this embodiment, the process cartridges PY to PK are attached to the apparatus body 1A in a state stored in the cartridge tray 13, an area (space) through which the cartridge tray 13 passes is also included in the cartridge detachment locus T1. That is, a collection of spaces through which any part of the process cartridges PY to PK and the cartridge tray 13 passes when the cartridge tray 13 is moved along the guide rail 29 is the cartridge detachment locus T1 in this embodiment.

One side of limits of a moving range of the cartridge tray 13 along the guide rail 29 is a position of the cartridge tray 13 at the time when the pivoting of the cartridge door 83 from the closed position to the opened position has been completed. The other side of the limits of the moving range of the cartridge tray 13 along the guide rail 29 is a position in which the draw-out of the cartridge tray 13 in the Y direction is stopped by a stopper in the guide rail 29. That is, in the state where the cartridge door 83 is positioned in the opened position, the cartridge tray 13 moves from the position (i.e., inserted position) stored in the apparatus body 1A to the position (i.e., draw-out position) stopped by the stopper in the guide rail 29. At this time, the range in which the cartridge tray 13 moves (locus drawn by the cartridge tray 13) is the moving range of the cartridge tray 13 (area through which the cartridge tray 13 passes). In a state where the draw-out of the cartridge tray 13 in the Y direction is stopped by the stopper in the guide rail 29, part of the cartridge tray 13 is positioned on the outside of the apparatus body 1A. In this state, the attachment and detachment of the process cartridges PY to PK to and from the cartridge tray 13 are allowed. Further, the cartridge tray 13 is coupled to the apparatus body 1A (state not separated from the apparatus body 1A). To be noted, in a case where it is not possible to define the cartridge detachment locus by referring to the guide rail 29, the movement locus through which the cartridge passes at a normal detachment operation can be considered as the cartridge detachment locus. For example, in a case of a cartridge which is directly attached to and detached from the apparatus body 1A without using a cartridge tray (cartridge supporting member), a movement locus through which the cartridge passes during the movement along a guide shape disposed on the apparatus body 1A is the cartridge detachment locus.

In this embodiment, as described above, the arm pressing portion 83b presses the lifting arm 74 along with the opening of the cartridge door 83 so as to pivot the lifting arm 74 in the E1 direction. That is, the lifting member moves with respect to the apparatus body in conjunction with the movement of the opening/closing member from the closed position to the opened position. Then, in the state where the cartridge door 83 is positioned in the opened position, the whole of the lifting arm 74 is positioned outside of the cartridge detachment locus T1 (outside of the movement locus). On the other hand, as shown by the broken line in FIG. 8, in the case where the cartridge door 83 is positioned in the closed position, at least part of the lifting arm 74 is positioned inside of the cartridge detachment locus T1 (inside of the movement locus). To be noted, a position of the lifting arm 74 for the case where the cartridge door 83 is positioned in the closed position refers to a standby position (upper position of the lifting arm 74 shown in FIG. 4) not performing the sheet feeding operation.

As described above, the lifting arm 74 recedes outside of the cartridge detachment locus in conjunction with the opening of the cartridge door 83. Thereby, when the cartridge tray 13 is drawn out from or inserted into the apparatus body 1A, it is possible to avoid the interference of the process cartridges PY to PK or the cartridge tray 13 in the lifting arm 74 and the pickup roller 71. Further, it is possible to decrease a possibility that the user accidentally touches the lifting arm 74 at the time of holding and operating the holding portion 13a of the cartridge tray 13. To be noted, the position of the lifting arm 74 in the state where the cartridge door 83 is positioned in the closed position is a further lower position than the lower position (refer to FIG. 4) of the lifting arm 74 described above.

Further, as shown in FIG. 8, in the state where the cartridge door 83 is positioned in the closed position, the lifting arm 74 projects in the Y direction from the side surface position Y1 of the image forming apparatus 1 in the case where the cartridge door 83 and the cover member 82 are respectively in the closed and stored position (refer to FIG. 6). In other words, in the state where the opening/closing member is positioned in the opened position, with respect to the horizontal direction (Y direction) in a case viewed in the rotational axis direction of the feed roller, at least part of the lifting member projects outside from a position (Y1) of the side surface of the image forming apparatus for the case where the opening/closing member is positioned in the closed position. As described above, since a space outside of the side surface position Y1 of the image forming apparatus 1 at the time when the cartridge door 83 and the cover member 82 are closed is utilized, it becomes easier to evacuate the lifting arm 74 into the outside of the cartridge detachment locus T1.

Further, with reference to an upper position of the lifting arm 74 (refer to FIG. 3), a pivoting amount of the lifting arm 74 in the state where the cartridge door 83 is positioned in the opened position is larger than a pivoting amount of the lifting arm 74 at the time of feeding the sheet (refer to FIG. 4). That is, in conjunction with the opening of the cartridge door 83, the lifting arm 74 pivots in a manner surpassing a pivoting range at the time of feeding the sheet. Thereby, in the state where the cartridge door 83 is positioned in the opened position, it is possible to more easily secure the required size of the cartridge detachment locus T1 above the lifting arm 74.

Further, along with the opening of the cartridge door 83, cover members supported by the cartridge door 83 also pivot. Then, in the state where the cartridge door 83 is positioned in the opened position, at least part of the lifting arm 74 is positioned below the sheet stacking surface (upper surface) of the sheet stacking tray 81 at the time when the cover member 82 is positioned in the stackable position. Thereby, it is easy to secure the required size of the cartridge detachment locus T1 above the lifting arm 74 in the state where the cartridge door 83 is positioned in the opened position.

To be noted, at the time of returning the cartridge door 83 from the opened position to the closed position, basically, a procedure is performed in reverse order described above. That is, when the cartridge door 83 pivots in a counterclockwise direction in FIG. 8 from the state shown in FIG. 8, the lifting arm 74 follows the cartridge door 83, and pivots in the E2 direction by the urging force of the arm urging spring. Thereafter, when the projection portion 74a of the lifting arm 74 has come into contact with the first surface 75c1 of the pressing lever 75, the pivoting of the lifting arm 74 is paused. However, as the pickup roller 71 is continuously pressed on the sheet stacking tray 81, the lifting arm 74 pivots in the E2 direction, and the projection portion 74a rides over a ridgeline portion between the first and second surfaces 75c1 and 75c2. Consequently, at the time when the cartridge door 83 has reached the closed position, as shown in FIG. 6, the lifting arm 74 is abutted onto the part (P3) of the apparatus Body 1A by the urging force of the pressing spring 76, so that the lifting arm 74 is positioned.

Further, while the operations of a case where the cover member 82 is in the stored position are shown in FIGS. 6 to 8, even in a case where, in the state where the cover member 82 is in the stackable position, the cartridge door 83 is moved from the closed position to the opening state, in conjunction with the cartridge door 83, the lifting arm 74 recedes into the outside of the cartridge detachment locus. That is, the arm pressing portion 83b comes into contact with the lifting arm 74 at any one time during the process of moving the cartridge door 83 from the closed position to the opened position as shown in FIG. 7, so that the lifting arm 74 is pressed in the E2 direction so as to evacuate the lifting arm 74 into the outside of the cartridge detachment locus.

As escribed above, in the image forming apparatus 1 of this embodiment, in the process of the movement of the cartridge door 83 from the closed position to the opened position, in conjunction with the cartridge door 83, the lifting arm 74 recedes from the inside to the outside of the cartridge detachment locus. With the configuration described above, in the state where the cartridge door 83 is positioned in the closed position, it is possible to also utilize a space inside of the cartridge detachment locus for a disposing space of the lifting arm 74 and the pickup roller 71, so that design flexibility for the sheet feeding apparatus 70 is improved. Further, since the lifting arm 74 recedes into the outside of the cartridge detachment locus when the cartridge door 83 has been moved from the closed position to the opened position, it is possible to smoothly attach and detach the process cartridges PY to PK. That is, in a case where the sheet feeding apparatus 70 and the cartridge door 83 are disposed on the same side surface of the image forming apparatus 1 so as to improve usability, it is possible to smoothly attach and detach the process cartridges PY to PK without being interfered by the lifting arm 74 constituting the sheet feeding apparatus 70. That is, by this embodiment, it is possible to simultaneously achieve the improvement in the usability and the design flexibility.

To be noted, as tangible benefits of the improvement in the design flexibility for the sheet feeding apparatus 70, (1) and (2) described below are included. However, it is acceptable to determine the design of the sheet feeding apparatus 70 in accordance with a specific configuration and required capability of the image forming apparatus.

(1) For example, a case where the lifting arm 74 is disposed such that the lifting arm 74 is always positioned below the cartridge detachment locus T1 so as to avoid the interference in the cartridge detachment locus T1 is considered. In this case, since it is not possible to utilize the space inside of the cartridge detachment locus T1 for the disposing space of the lifting arm 74 even in the state where the cartridge door 83 is in the closed position, the lifting arm 74 is disposed at an angle nearer the horizontal than this embodiment. As described above, to an extent that a range occupied by the lifting arm 74 is expanded in the horizontal direction (Y direction when viewed in the X direction), this leads to an increase in the size of the image forming apparatus 1. On the other hand, by this embodiment, the space inside of the cartridge detachment locus T1 is utilized for the disposing space of the lifting arm 74. Thereby, in comparison with the distal end position of the lifting arm 74 in the state where the cartridge door 83 is in the opened position, the distal end position of the lifting arm 74 in the state where the cartridge door 83 is in the closed position is positioned on the side of the apparatus body (upstream side in the Y direction). Therefore, since the length of the lifting arm 74 as it is does not become the range occupied by the lifting arm 74 in the horizontal direction in the state where the cartridge door 83 is in the closed position, it is possible to avoid increase in size of the image forming apparatus 1.

(2) Further, so as to stably feed the sheet by the pickup roller 71, it is desirable that the lifting arm 74 has a certain length (distance from the axis A1 of the lifting arm 74 to the rotational axis of the pickup roller 71). If the lifting arm 74 is long, a change in a pivoting angle of the lifting arm 74 with respect to changes in a stacking amount and a stacking position in the sheet stacking tray 81 becomes relatively small. Consequently, since a fluctuation range of a deformation amount of the pressing spring 76 also becomes small so as to reduce a fluctuation in the pressing force of the pickup roller 71 applied to the sheet, the pickup roller 71 is able to stably feed the sheet. In addition, even in a case where the lifting arm 74 is lengthened taking into consideration the stability of the sheet supply, for the similar reason described in (1) above, it is possible to avoid increase in size of the image forming apparatus 1.

Incidentally, as an alternative configuration in which the manual feed tray type sheet feeding apparatus 70 and the door unit 80 are disposed on the same side surface of the mage forming apparatus 1, a configuration in which the sheet feeding apparatus 70 is disposed as a part of the door unit 80 is conceivable. That is, in this configuration, a sheet feeding unit including the lifting arm 74 and the pickup roller 71 is supported by the cartridge door 83, and moves integrally with the cartridge door 83. While, by this alternative configuration, it is possible to evacuate the sheet feeding unit into the outside of the cartridge detachment locus by the opening of the cartridge door 83, an interface portion for the drive transmission between the sheet feeding unit and the apparatus body becomes necessary. In general, in the interface portion, positional variations due to component tolerances and the like become large, and it is possible that the accuracy of the drive transmission is worsened. Further, while it is possible to improve the accuracy of the drive transmission by applying a drive configuration of a pendulum type gear and the like, it adds complexity to the configuration, so that a cost and a space are increased.

On the other hand, in this embodiment, even in the state where the cartridge door 83 is positioned in the opened position, the coupling of a drive transmission path from the motor M1 (refer to FIG. 1) to the pickup roller 71 and the lifting arm 74 is maintained by a drive transmission unit such as the partially toothless gear 91 (refer to FIG. 2). In other words, in both of the states where the opening/closing member is positioned in the closed and opened positions, a state where the driving source is coupled to the feed roller and the lifting member via the drive transmission unit is maintained. Therefore, it is not necessary to use the interface portion as described above for the drive transmission, and possible to apply a simple drive configuration.

Variant

While, in this embodiment, the sheet stacking tray 81 is disposed integrally with the cover member 82, it is acceptable that the sheet stacking tray 81 is relatively movable with respect to the cover member 82. In this case, instead of a type in which the pickup roller 71 is pressed onto the sheet stacked on the sheet stacking tray 81 by the force of lowering the lifting arm 74, it is acceptable to apply a type in which the pickup roller 71 is pressed onto the sheet stacking tray 81 by the force of lifting the sheet stacking tray 81. In a case of the later type (tray pressing type), while the lifting arm 74 moves in conjunction with the opening/closing of the cartridge door 83 and the cover member 82, the lifting arm 74 is fixed at the time of feeding the sheet, and a side of the sheet stacking tray 81 performs a lifting operation.

Further, in this embodiment, the cover member 82 including the sheet stacking tray 81 is pivotably supported by the cartridge door 83 (opening/closing member). It is not limited to this, and, if the lifting arm 74 recedes into the outside of the cartridge detachment locus in conjunction with the opening of the opening/closing member, for example, it is acceptable that the sheet stacking tray 81 (sheet stacking portion, sheet supporting potion) is fixed to the apparatus body 1A. Further, it is acceptable that the cover member 82 including the sheet stacking tray 81 is pivotably supported by the apparatus body 1A, independently from the cartridge door 83. To be noted, it is acceptable that the sheet stacking portion (sheet supporting potion) supports only part of the sheet (for example, leading edge in the sheet feeding direction) to be fed by the feed roller. The sheet feeding apparatus is not limited to an apparatus which supplies the sheet while separating a plurality of sheets collectively stacked on the sheet stacking portion, and it is acceptable that the sheet feeding apparatus is an apparatus in which the feed roller feeds the sheet inserted one sheet at a time by the user.

Further, in this embodiment, the plurality of process cartridges PY to PK are attached to and detached from the apparatus body 1A in a manner supported by the cartridge tray 13. It is not limited to this, and it is acceptable to directly attach and detach the cartridges to and from the apparatus body 1A without using the cartridge tray 13 (cartridge supporting member). Further, it is acceptable to construct the process cartridges PY to PK in a manner separable to developing units including the developing rollers 12 and drum units including the photosensitive drums 11. It is acceptable that drum cartridges including photosensitive drums 11 and developing cartridges including the developing rollers 12 each are detachably attached to the cartridge tray 13. It is acceptable that the cartridge tray 13 includes the photosensitive drums 11 and the developing cartridges including the developing rollers 12 are detachably attached to the cartridge tray 13. Further, a number of the cartridges are not necessarily plural, and it is acceptable that one single cartridge is detachably attached to the apparatus body 1A.

Further, in this embodiment, part of the cartridge door 83 directly presses the lifting arm 74 so as to move the lifting arm 74 in conjunction with the opening of the cartridge door 83. It is not limited to this, and it is acceptable to move the lifting arm 74 in conjunction with the opening of the cartridge door 83 via a member interlocked with the cartridge door 83.

Further, in this embodiment, in the state where the cartridge door 83 is positioned in the closed position, part of the lifting arm 74 is positioned inside of the cartridge detachment locus T1. It is not limited to this, and it is conceivable that, in the state where the cartridge door 83 is positioned in the closed position, the lifting arm 74 is disposed in a position outside of the cartridge detachment locus T1 and adjacent to the cartridge detachment locus T1. Even in this case, by moving the lifting arm 74 downward in conjunction with the opening of the cartridge door 83, it is possible to further reduce a possibility that the cartridge tray 13 and the process cartridges PY to PK come into contact with the lifting arm 74. Further, when the user holds and operates the holding portion 13a of the cartridge tray 13, it is possible to reduce a possibility of accidentally touching the lifting arm 74. Further, since it is possible to dispose the lifting arm 74 in a position adjacent to the cartridge detachment locus T1, the design flexibility for the sheet feeding apparatus 70 is improved. As described above, the lifting member moves downward in conjunction with the movement of the opening/closing member from the closed position to the opened position, and, in the state where the opening/closing member is positioned in the opened position, the cartridge is attached to and detached from the apparatus body by passing above the lifting member. In this case, even in a case where, in the state where the opening/closing member is positioned in the closed position, the lifting member is not positioned inside of the cartridge detachment locus, it is possible to simultaneously achieve both of the improvement of the usability and the design flexibility.

As described above, by this embodiment, it is possible to simultaneously achieve both of the improvement of the usability and the design flexibility.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-090834, filed on May 31, 2021, which is hereby incorporated by reference herein in its entirety.

What is claimed is:

1. An image forming apparatus comprising:
an apparatus body including a side surface portion with an opening;
a cartridge detachably attached to the apparatus body;
an opening/closing member configured to be moved with respect to the apparatus body between a closed position and an opened position, the closed position being a position in which the opening/closing member covers the opening of the side surface portion, and the opened position being a position in which the opening is exposed and the cartridge is allowed to be attached to and detached from the apparatus body through the opening;
a sheet stacking portion;
a pickup roller configured to feed a sheet stacked on the sheet stacking portion toward the apparatus body; and
a lifting member rotatably supporting the pickup roller and configured to:
lift and lower the pickup roller so that the pickup roller is brought into contact with and is separated from the sheet on the sheet stacking portion in a state where the opening/closing member is in the closed position; and
move with respect to the apparatus body in conjunction with a movement of the opening/closing member from the closed position to the opened position,
wherein, in each of a state where the cartridge is being attached to and a state where the cartridge is being detached from the apparatus body through the opening, the cartridge passes through a movement locus,
wherein, in the state where the opening/closing member is in the closed position, at least part of the lifting member is positioned inside of the movement locus, and
wherein, in a state where the opening/closing member is in the opened position, an entirety of the lifting member is positioned outside of the movement locus.

2. The image forming apparatus according to claim 1, wherein, in the state where the opening/closing member is in the opened position, with respect to a horizontal direction as viewed in a rotational axis direction of the pickup roller, at least part of the lifting member is projected toward outside of a position of the side surface portion of the image forming apparatus relative to the state where the opening/closing member is positioned in the closed position.

3. The image forming apparatus according to claim 1, wherein the opening/closing member includes a pressing portion configured to come into contact with the lifting member during the movement of the opening/closing member from the closed position to the opened position to press the lifting member toward the outside of the movement locus.

4. The image forming apparatus according to claim 3, wherein:
the opening/closing member is configured to pivot around a first axis,
the lifting member is configured to pivot around a second axis parallel to and different from the first axis,
the lifting member includes a projection portion projecting farther in a radial direction with respect to the second axis than a distal end position of the pickup roller in the radial direction, and
in the state where the opening/closing member is in the opened position, the pressing portion is configured to come into contact with the projection portion to hold the lifting member in a position on the outside of the movement locus.

5. The image forming apparatus according to claim 1, wherein:
the lifting member is configured to move downward in conjunction with the movement of the opening/closing member from the closed position to the opened position, and
in the state where the opening/closing member is in the opened position, the entirety of the lifting member is positioned below the movement locus.

6. The image forming apparatus according to claim 1, further comprising:
a cover member supporting the sheet stacking portion and configured to be opened and closed with respect to the opening/closing member,
wherein, in the state where the opening/closing member is in the closed position, the cover member is configured to move between a stored position and a stackable position, the stored position being a position in which the cover member is stored in a space provided in the opening/closing member, and the stackable position being a position in which the cover member projects toward outside of the image forming apparatus to allow the sheet to be stacked on the sheet stacking portion, and
in a state where the opening/closing member is in the closed position and the cover member is in the stored position, the lifting member and the pickup roller are accommodated in a space between the opening/closing member and the cover member.

7. The image forming apparatus according to claim 6, wherein, in the state where the opening/closing member is in the closed position and the cover member is in the stored position, the pickup roller is positioned above a pivot axis of the lifting member and overlaps with the pivot axis of the lifting member as viewed in a vertical direction.

8. The image forming apparatus according to claim 6, wherein, in the state where the opening/closing member is in the opened position, at least part of the lifting member is positioned below a position of an upper surface of the sheet stacking portion in the stackable position.

9. The image forming apparatus according to claim 1, wherein:
   in the state where the opening/closing member is in the closed position, the lifting member is configured to pivot between a lower position and an upper position, the lower position being a position in which the pickup roller is brought into contact with the sheet stacked on the sheet stacking portion, and the upper position being a position in which the pickup roller is separated upward from the sheet stacked on the sheet stacking portion, and
   in the state where the opening/closing member is in the opened position, the lifting member is positioned at a further lower position than the lower position.

10. The image forming apparatus according to claim 1, further comprising a cartridge supporting member configured to:
    detachably support the cartridge; and
    move between an inserted position inserted into the apparatus body and a draw-out position drawn out from the apparatus body through the opening, the draw-out position being a position in which the cartridge is attached to and detached from the cartridge supporting member.

11. The image forming apparatus according to claim 1, further comprising:
    a conveyance roller disposed downstream of the pickup roller in a sheet feeding direction and configured to convey the sheet,
    wherein the lifting member is configured to pivot around a rotational axis of the conveyance roller.

12. The image forming apparatus according to claim 1, further comprising:
    a driving source disposed in the apparatus body; and
    a drive transmission unit supported by the apparatus body and configured to transmit driving force of the driving source to the pickup roller and the lifting member,
    wherein, in both the states where the opening/closing member is in the closed position and where the opening/closing member is in the opened position, a coupling of the driving source to the pickup roller and the lifting member via the drive transmission unit is maintained.

13. The image forming apparatus according to claim 1, wherein, the sheet stacking portion is configured to allow stacking of the sheet thereon in a state where the lifting member projects from the side surface portion of the apparatus body toward outside of the apparatus body.

14. An image forming apparatus comprising:
    an apparatus body including a side surface portion with an opening;
    a cartridge detachably attached to the apparatus body;
    an opening/closing member configured to be moved with respect to the apparatus body between a closed position and an opened position, the closed position being a position in which the opening/closing member covers the opening of the side surface portion, and the opened position being a position in which the opening is exposed and the cartridge is allowed to be attached to and detached from the apparatus body through the opening;
    a sheet stacking portion;
    a pickup roller configured to feed a sheet stacked on the sheet stacking portion toward the apparatus body; and
    a lifting member rotatably supporting the pickup roller and configured to lift and lower the pickup roller so that the pickup roller is brought into contact with and is separated from the sheet on the sheet stacking portion in a state where the opening/closing member is in the closed position,
    wherein the lifting member is configured to move downward in conjunction with a movement of the opening/closing member from the closed position to the opened position so that the cartridge is attached to and detached from the apparatus body through a space above the lifting member in a state where the opening/closing member is in the opened position, and
    wherein, in the state where the opening/closing member is in the closed position, the lifting member is configured to pivot between a lower position and an upper position, the lower position being a position in which the pickup roller is brought into contact with the sheet stacked on the sheet stacking portion, and the upper position being a position in which the pickup roller is separated upward from the sheet stacked on the sheet stacking portion, and
    wherein, in the state where the opening/closing member is in the opened position, the lifting member is positioned at a further lower position than the lower position.

15. The image forming apparatus according to claim 14, wherein, in the state where the opening/closing member is in the opened position, with respect to a horizontal direction as viewed in a rotational axis direction of the pickup roller, at least part of the lifting member is projected toward outside of a position of the side surface portion of the image forming apparatus relative to the state where the opening/closing member in the closed position.

16. The image forming apparatus according to claim 14, wherein:
    in each of a state where the cartridge is being attached to and a state where the cartridge is being detached from the apparatus body through the opening, the cartridge passes through a movement locus, and
    the opening/closing member includes a pressing portion configured to come into contact with the lifting member during the movement of the opening/closing member from the closed position to the opened position to press the lifting member toward outside of the movement locus.

17. The image forming apparatus according to claim 16, wherein:
    the opening/closing member is configured to pivot around a first axis,
    the lifting member is configured to pivot around a second axis parallel to and different from the first axis,
    the lifting member includes a projection portion projecting farther in a radial direction with respect to the second axis than a distal end position of the pickup roller in the radial direction, and
    in the state where the opening/closing member is in the opened position, the pressing portion is configured to come into contact with the projection portion to hold the lifting member in a position on the outside of the movement locus.

18. The image forming apparatus according to claim 14, further comprising a cartridge supporting member configured to:
  detachably support the cartridge; and
  move between an inserted position inserted into the apparatus body and a draw-out position drawn out from the apparatus body through the opening, the draw-out position being a position in which the cartridge is attached to and detached from the cartridge supporting member.

19. The image forming apparatus according to claim 14, further comprising:
  a driving source disposed in the apparatus body; and
  a drive transmission unit supported by the apparatus body and configured to transmit driving force of the driving source to the pickup roller and the lifting member,
  wherein, in both the states where the opening/closing member is in the closed position and where the opening/closing member is in the opened position, a coupling of the driving source to the pickup roller and the lifting member via the drive transmission unit is maintained.

20. The image forming apparatus according to claim 1, wherein the lifting member supports a gear configured to drive the pickup roller.

* * * * *